(12) United States Patent
Kim et al.

(10) Patent No.: US 9,609,632 B2
(45) Date of Patent: Mar. 28, 2017

(54) METHOD AND DEVICE FOR MANAGING RAN RESOURCES IN WIRELESS COMMUNICATION SYSTEM

(71) Applicant: LG ELECTRONICS INC., Seoul (KR)

(72) Inventors: Taehyeon Kim, Anyang-si (KR); Laeyoung Kim, Anyang-si (KR); Jaehyun Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/439,548

(22) PCT Filed: Jul. 19, 2013

(86) PCT No.: PCT/KR2013/006490
§ 371 (c)(1),
(2) Date: May 21, 2015

(87) PCT Pub. No.: WO2014/069748
PCT Pub. Date: May 8, 2014

(65) Prior Publication Data
US 2015/0282145 A1 Oct. 1, 2015

Related U.S. Application Data

(60) Provisional application No. 61/721,465, filed on Nov. 1, 2012.

(51) Int. Cl.
*H04W 72/00* (2009.01)
*H04W 72/04* (2009.01)
*H04W 76/04* (2009.01)

(52) U.S. Cl.
CPC ..... *H04W 72/0406* (2013.01); *H04W 76/048* (2013.01); *H04W 76/046* (2013.01)

(58) Field of Classification Search
USPC .......................................... 455/450
See application file for complete search history.

(56) References Cited

U.S. PATENT DOCUMENTS

2012/0064932 A1 3/2012 Lim et al.
2012/0155404 A1 6/2012 Shin et al.
(Continued)

FOREIGN PATENT DOCUMENTS

KR 10-2011-0119555 A 11/2011
KR 10-2012-0028197 A 3/2012
(Continued)

*Primary Examiner* — Joel Ajayi
(74) *Attorney, Agent, or Firm* — Birch, Stewart, Kolasch & Birch, LLP

(57) ABSTRACT

The present invention relates to a wireless communication system and, more specifically, to a method and device for managing resources of a radio access network (RAN). A method by which a network node of a wireless communication system supports resource management of a RAN, according to one embodiment of the present invention, comprises the steps of: receiving and storing, by the network node, a portion or all of user equipment (UE) context information from the RAN at a first time point; and transmitting, by the network node, the portion or all of the UE context information to the RAN at a second time point, wherein a radio resource control (RRC)-connected state for the UE can be maintained for a time including the first time point and the second time point.

12 Claims, 7 Drawing Sheets

(56) References Cited

U.S. PATENT DOCUMENTS

| | | |
|---|---|---|
| 2012/0209978 A1 | 8/2012 | Cho et al. |
| 2013/0039262 A1 | 2/2013 | Lim et al. |
| 2013/0324141 A1 | 12/2013 | Jung et al. |

FOREIGN PATENT DOCUMENTS

| | | |
|---|---|---|
| KR | 10-2012-0070444 A | 6/2012 |
| KR | 10-2012-0094369 A | 8/2012 |
| KR | 10-2012-0096138 A | 8/2012 |

METHOD AND DEVICE FOR MANAGING RAN RESOURCES IN WIRELESS COMMUNICATION SYSTEM

CROSS REFERENCE TO RELATED APPLICATIONS

This application is the National Phase of PCT International Application No. PCT/KR2013/006490, filed on Jul. 19, 2013, which claims priority under 35 U.S.C. 119(e) to U.S. Provisional Application No. 61/721,465, filed on Nov. 1, 2012, all of which are hereby expressly incorporated by reference into the present application.

TECHNICAL FIELD

The present invention relates to a wireless communication system and more particularly, to a method and apparatus for managing resources of a Radio Access Network (RAN).

BACKGROUND ART

Machine Type Communication (MTC) refers to a communication scheme involving one or more machines. MTC is also called Machine-to-Machine (M2M) communication or Internet of Things (IoT). A machine is an entity that does not need direct human manipulation or intervention. For example, a user device such as a smartphone that can be automatically connected to a network and perform communication without a user's manipulation/intervention as well as a meter or automatic vending machine equipped with a mobile communication module may be an example of the machine. Such various exemplary machines will be referred to as MTC devices or MTC User Equipments (UEs) in the present disclosure. That is, MTC means communication performed by one or more machines (i.e., MTC devices) without human manipulation/intervention.

MTC may cover communication between MTC devices (e.g., Device-to-Device (D2D) communication) and communication between an MTC device and an MTC application server. For example, communication between an MTC device and an MTC application server may be communication between an automatic vending machine and a server, communication between a Point Of Sale (POS) device and a server, and communication between an electricity, gas, or water meter and a server. Besides, MTC-based applications may include security, transportation, health care, etc.

DISCLOSURE

Technical Problem

An object of the present invention devised to solve the conventional problem is to provide a method for efficiently managing resources of a Random Access Network (RAN) device (e.g., a Base Station (BS)), when long Radio Resource Control (RRC) Connected state is used to support Machine Type Communication (MTC)-supporting schemes (e.g., long Discontinuous Reception (DRX), User Equipment (UE) offline monitoring, etc.).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for supporting resource management of a Radio Access Network (RAN) by a network node in a wireless communication system includes receiving part or all of User Equipment (UE) context information from the RAN and storing the received part or all of the UE context information, at a first time point, and transmitting the part or all of the UE context information to the RAN at a second time point. The UE is kept in a Radio Resource Control (RRC) connected state during a time period including the first time point and the second time point.

In another aspect of the present invention, a method for managing resources by a RAN in a wireless communication system includes transmitting part or all of UE context information to a network node at a first time point, and retrieving the part or all of the UE context information from the network node at a second time point. The part or all of the UE context information transmitted to the network node is stored in the network node at the first time point, and the UE is kept in an RRC connected state during a time period including the first time point and the second time point.

In another aspect of the present invention, a network node for supporting resource management of a RAN in a wireless communication system includes a transceiver module, and a processor. The processor is configured to receive part or all of UE context information from the RAN at a first time point through the transceiver module, store the received part or all of the UE context information, and transmit the part or all of the UE context information to the RAN at a second time point through the transceiver module. The UE is kept in an RRC connected state during a time period including the first time point and the second time point.

In another aspect of the present invention, a RAN for managing resources in a wireless communication system includes a transceiver module, and a processor. The processor is configured to transmit part or all of UE context information to a network node at a first time point through the transceiver module, and retrieve the part or all of the UE context information from the network node at a second time point. The part or all of the UE context information transmitted to the network node is stored in the network node at the first time point, and the UE is kept in an RRC connected state during a time period including the first time point and the second time point.

The followings are applicable commonly to the embodiments of the present invention.

The network node may further receive send-back timer information from the RAN.

The second time point may be determined based on the send-back timer information.

The part or all of the UE context information may not be stored in the RAN during a time period between the first time point and the second time point.

The UE may perform long Discontinuous Reception (DRX).

The first time point may be a time point when an on-duration of the UE ends, the second time point may be a time point when an off state period of the UE ends, and a cycle of the long DRX may include the on-duration and the off state period.

An offline indication operation may be configured for the UE and a detection time timer for the offline indication operation may be set to an integer multiple of the cycle of the long DRX.

The part of the UE context information may include changed UE context information from UE context information previously stored in the network node.

The network node may receive context backup capability information about the RAN, and transmit a message allowing context backup of the RAN based on the context backup capability information about the RAN.

The RAN may include a Base Station (BS) and the network node may include one or more of a Mobility Management Entity (MME), a Serving GPRS Supporting Node (SGSN), a Mobile Switching Center (MSC), and a Serving GateWay (S-GW).

The UE context information may be context information about a Machine Type Communication (MTC) UE.

A predetermined bearer Identifier (ID) or a predetermined channel may be allocated to the MTC UE and the method for supporting resource management may be applied only to the predetermined bearer ID or the predetermined channel.

The forgoing comprehensive description and following detailed description of the present invention are mere examples given to additionally describe the present invention described in the appended claims.

Advantageous Effects

According to the present invention, when long Radio Resource Control (RRC) Connected state is used to support Machine Type Communication (MTC)-supporting schemes (e.g., long Discontinuous Reception (DRX), User Equipment (UE) offline monitoring, etc.), a method and apparatus for efficiently managing resources of a Random Access Network (RAN) device (e.g., a Base Station (BS)) can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
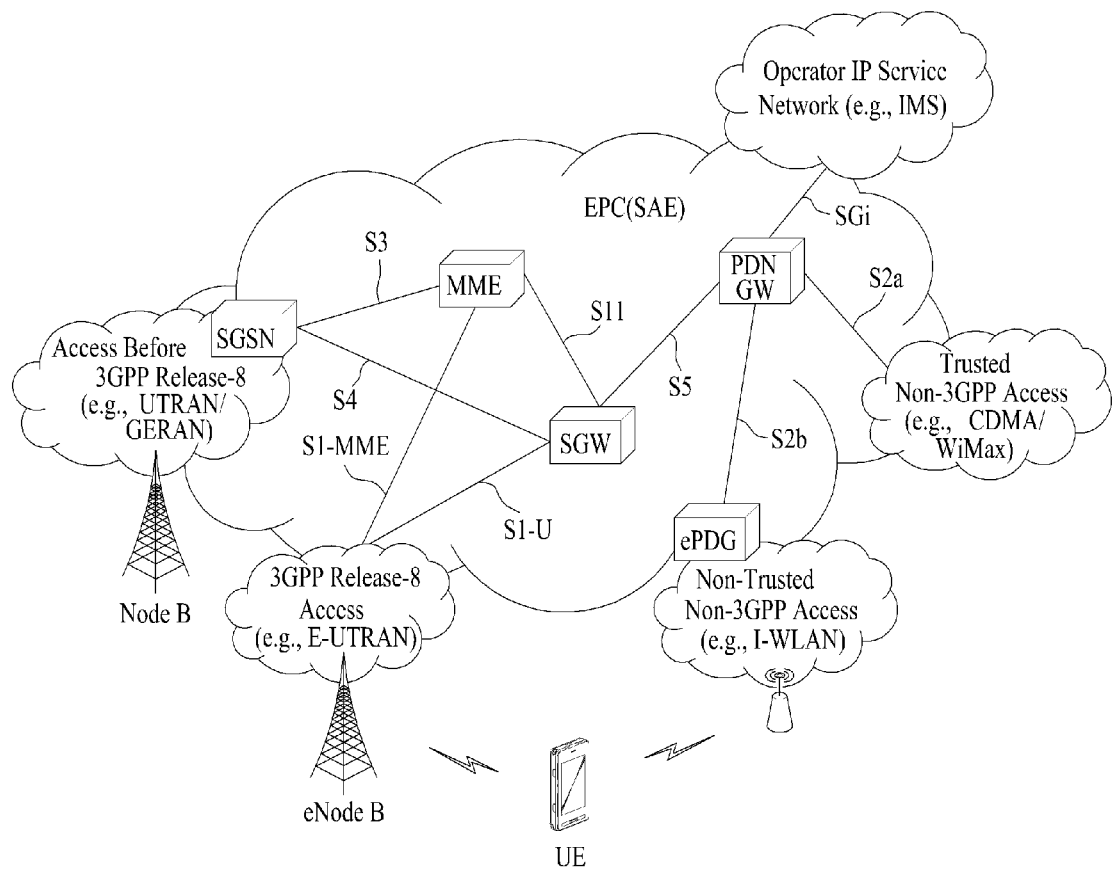
FIG. 1 illustrates an overall structure of an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on the 3GPP LTE and LTE-A systems. However, the technical features of the present invention are not limited thereto.

Terms used in the present disclosure are defined as follows.

UMTS (Universal Mobile Telecommunication System): a $3^{rd}$ Generation (3G) mobile communication technology based on Global System for Mobile Communication (GSM) developed by the 3GPP.

EPS (Evolved Packet System): a network system including an Evolved Packet Core (EPC) which is a Packet Switched (PS) core network based on Internet Protocol (IP) and an access network such as LTE/UMTS Terrestrial Radio Access Network (UTRAN). The EPS is a network evolved from UMTS.

Node B: a Base Station (BS) of GERAN/UTRAN, which is installed outdoors and has macro cell-level coverage.

eNB (eNode B): a BS of E-UTRAN, which is installed outdoors and has macro cell-level coverage.

UE (User Equipment): a UE can also be referred to as a terminal, a Mobile Equipment (ME), a Mobile Station (MS) or the like. In addition, the UE may be a portable device such as a laptop computer, a portable phone, a Personal Digital Assistant (PDA), a smartphone, or a multimedia device, or a non-portable device such as a Personal Computer (PC) or a vehicle-mounted device. The term UE or terminal, as used in relation to MTC, may refer to an MTC device.

IMSI (International Mobile Subscriber Identity): a globally unique user Identifier (ID) assigned in a mobile communication network.

SIM (Subscriber Identity Module) card: a medium that stores user identification information such as an IMSI and subscriber information.

UICC (Universal Integrated Circuit Card): used in the same meaning as the SIM card.

HNB (Home Node B): a BS of a UMTS network, which is installed outdoors and has micro cell-level coverage.

HeNB (Home eNode B): a BS of an EPS network, which is installed outdoors and has micro cell-level coverage.

MME (Mobility Management Entity): a network node of an EPS network, which performs Mobility Management (MM) and Session Management (SM).

NAS (Non-Access Stratum): a higher-layer stratum of a control plane between a UE and an MME and a functional layer for signaling and exchanging traffic messages between the UE and a core network in a UMTS protocol stack. Major functions of the NAS are to support UE mobility and to support a session management procedure for establishing and maintaining an IP connection between a UE and a PDN GW.

PDN GW (Packet Data Network GateWay): a network node of an EPS network, which performs UE IP address assignment, packet screening and filtering, and charging data collection.

SGW (Serving GateWay): a mobility anchor and a network node of an EPS network, which performs packet routing, idle-mode packet buffering, and triggering of an MME's UE paging.

PCRF (Policy and Charging Rule Function): a node of an EPS network, which makes a policy decision to dynamically apply a different Quality of Service (QoS) and charging policy on a service flow basis.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a text sequence indicating or identifying a PDN. To connect to a requested service or network (PDN), a PGW is used. An APN is a predefined name (text sequence) in a network to detect such a PGW. For example, the APN may be expressed as internet.mnc012.mcc345.gprs.

MTC: communication conducted by a machine without human intervention.

MTC device: a UE (e.g., an automatic vending machine, a meter, etc.) having communication functionality through a core network and serving a specific purpose.

SCS (Service Capability Server): a server connected to a 3GPP network for communication between an MTC device located in a Home Public Land Mobile Network (HPLMN) and an MTC device using an MTC-Inter-Working Function (MTC-IWF). The SCS provides capability of using one or more applications.

MTC application: a service to which MTC is applied (e.g., remote metering, product movement tracking, etc.).

MTC application server: a server for executing an MTC application on a network.

MTC feature: a function of a network for supporting an MTC application. For example, MTC monitoring is a feature for preparing for equipment loss in an MTC application such as remote metering, and low mobility is a feature for an MTC application for an MTC device such as an automatic vending machine.

RAN (Radio Access Network): a unit including a Node B, an eNode B and a Radio Network Controller (RNC) for controlling the Node B and the eNode B in a 3GPP network, which is present between UEs and provides a connection to a core network.

RANAP (RAN Application Part): an interface between a control node (e.g., MME/Serving GPRS (General Packet Radio Service) Support Node (SGSN)/Mobile Switching Center (MSC)) of a core network and a RAN.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Hereinafter, a description will be given based on the above-defined terms.

FIG. 1 is a view schematically illustrating the architecture of an EPS.

The EPC is a fundamental element of System Architecture Evolution (SAE) for improving the performance of 3GPP technologies. SAE corresponds to a study item for determining network architecture supporting mobility between various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (i.e., a $2^{nd}$ Generation (2G) or $3^{rd}$ Generation (3G) mobile communication system), the function of a core network is implemented through two distinct sub-domains, that is, a Circuit-Switched (CS) sub-domain for voice and a Packet-Switched (PS) sub-domain for data. In the 3GPP LTE system evolved from the 3G communication system, the CS and PS sub-domains are unified into a single IP domain. That is, in the 3GPP LTE system, a connection between UEs having IP capability can be established through an IP-based BS (e.g., eNB), an EPC, and an application domain (e.g., an IP Multimedia Subsystem (IMS)). That is, the EPC is an architecture inevitably required to implement end-to-end IP services.

The EPC may include various components. FIG. 1 illustrates some of the components, for example, an SGW, a PDN GW, an MME, an SGSN, and an enhanced Packet Data Gateway (ePDG).

The SGW operates as a boundary point between a RAN and a core network and is an element functioning to maintain a data path between an eNB and a PDN GW. In addition, if a UE moves over an area served by an eNB, the SGW serves as a local mobility anchor point. That is, packets may be routed through the SGW, for mobility in an E-UTRAN defined after 3GPP Release-8. Further, the SGW may serve as an anchor point for mobility with another 3GPP network (a RAN defined before 3GPP Release-8, e.g., UTRAN or GSM (Global System for Mobile Communication)/EDGE (Enhanced Data rates for Global Evolution) Radio Access Network (GERAN)).

The PDN GW corresponds to a termination point of a data interface directed to a PDN. The PDN GW may support policy enforcement features, packet filtering, and charging support. In addition, the PDN GW may serve as an anchor point for mobility management with a 3GPP network and a non-3GPP network (e.g., an untrusted network such as Interworking Wireless Local Area Network (I-WLAN) and a trusted network such as a Code Division Multiple Access (CDMA) network or a WiMax network).

Although the SGW and the PDN GW are configured as separate gateways in the exemplary network architecture of FIG. 1, the two gateways may be implemented according to a single gateway configuration option.

The MME is an element that performs signaling and control functions to support access of a UE for a network connection, allocation of network resources, tracking, paging, roaming, and handover. The MME controls control-plane functions related to subscriber and session management. The MME manages a large number of eNBs and performs signaling for selection of a legacy gateway for handover to another 2G/3G network. In addition, the MME performs security procedures, terminal-to-network session handling, idle terminal location management, etc.

The SGSN handles all packet data for mobility management of a user to another 3GPP network (e.g., a GPRS network) and authentication of the user.

The ePDG serves as a security node for an untrusted non-3GPP network (e.g., an I-WLAN or Wi-Fi hotspot).

As described above in relation to FIG. 1, a UE having IP capabilities may access an IP service network (e.g., an IMS) provided by an operator via various elements in the EPC based on not only 3GPP access but also non-3GPP access.

FIG. 1 also illustrates various reference points (e.g., S1-U, S1-MME, etc.). In the 3GPP system, a conceptual link connecting two functions, which are present in different functional entities of an E-UTRAN and an EPC, is defined as a reference point. [Table 1] lists the reference points illustrated in FIG. 1. Various reference points other than those of [Table 1] may also be present according to the network architecture.

TABLE 1

| Reference Point | Description |
|---|---|
| S1-MME | Reference point for the control plane protocol between E-UTRAN and MME |
| S1-U | Reference point between E-UTRAN and SGW for inter-eNB path switching during handover and per-bearer user-plane tunneling |
| S3 | Reference point between MME and SGSN, which enables user and bearer information exchange for inter-3GPP access network mobility in idle and/or active state. This reference point can be used intra-PLMN or inter-PLMN (e.g. in the case of inter-PLMN handover). |
| S4 | Reference point between SGSN and SGW, which provides related control and mobility support between GPRS core and the 3GPP anchor function of SGW. In addition, if direct tunnel is not established, it provides user-plane tunneling. |
| S5 | Reference point between SGW and PDN GW, which provides user-plane tunneling and tunnel management. It is used for SGW relocation due to UE mobility and if SGW needs to connect to non-collocated PDN GW for required PDN |

TABLE 1-continued

| Reference Point | Description |
|---|---|
| | connectivity. |
| S11 | Reference point between MME and SGW |
| SGi | Reference point between PDN GW and PDN. PDN may be a public or private PDN outside an operator or an intra-operator PDN, e.g. for provisioning of IMS services. This reference point corresponds to Gi for 3GPP access. |

Among the reference points illustrated in FIG. 1, S2a and S2b correspond to non-3GPP interfaces. S2a is a reference point that provides related control and mobility support between the trusted non-3GPP access and the PDN GW to the user plane. S2b is a reference point that provides related control and mobility support between the ePDG and the PDN GW to the user plane.

Figure 2:
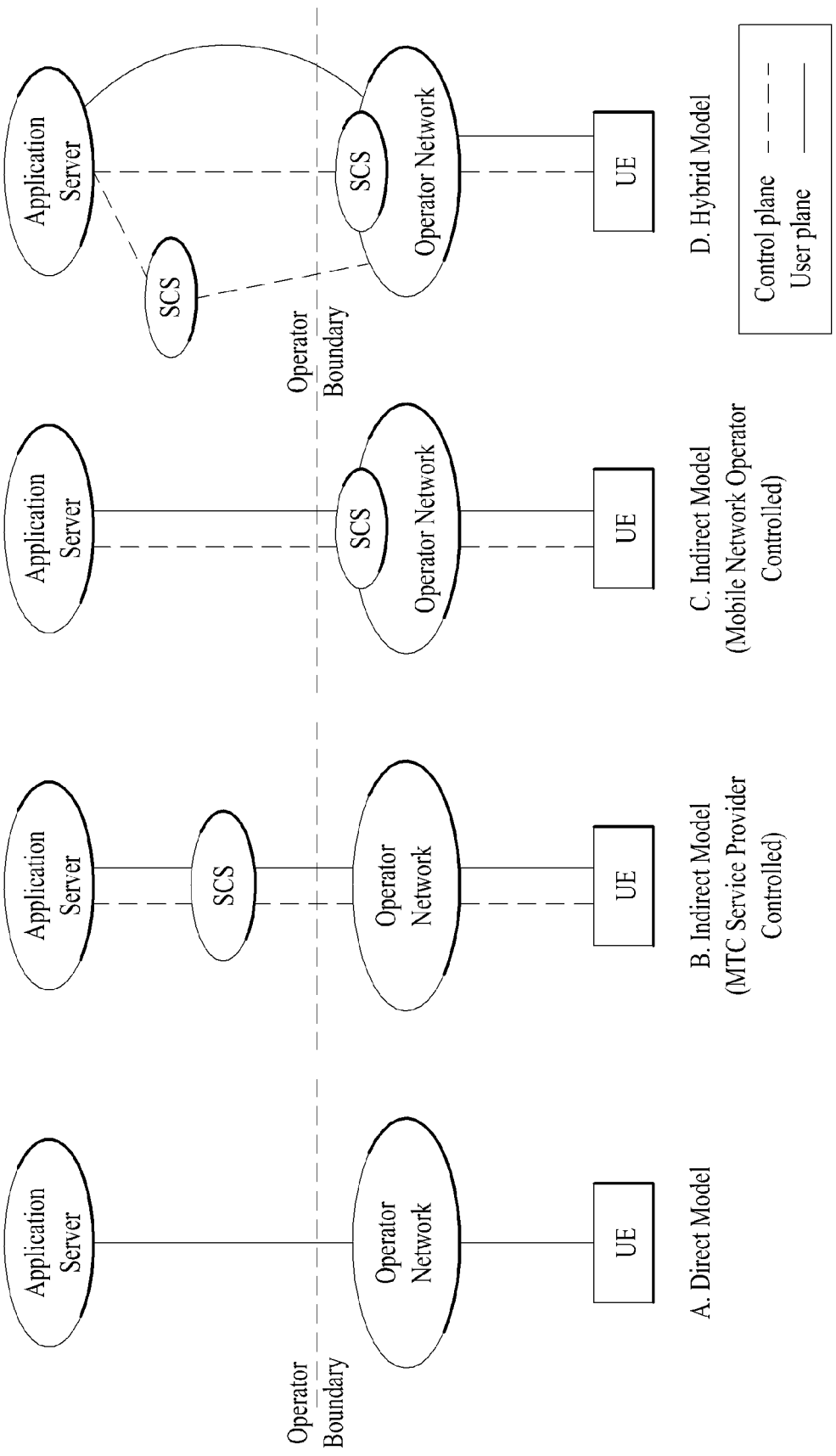
FIG. 2 illustrates exemplary Machine Type Communication (MTC) models.

FIG. 2 illustrates exemplary MTC models.

MTC applications are executed in an MTC device and an SCS, respectively and interact by communication through a network. Various models of MTC traffic may be designed depending on what is involved in communication between an MTC application and a 3GPP network. FIG. 2(a) illustrates a model of direct communication without an SCS, FIG. 2(b) illustrates a model in which an SCS is located outside an operator domain, and FIG. 2(c) illustrates a model in which an SCS is located inside an operator domain. Further, FIG. 2(a) corresponds to a direct communication scheme controlled by a 3GPP operator, FIG. 2(b) corresponds to a communication scheme controlled by a service provider, and FIG. 2(c) corresponds to a communication scheme controlled by a 3GPP operator.

In the direct model of FIG. 2(a), an MTC application is an Over-the-Top (OTT) application for the 3GPP network and communicates directly with a UE (or an MTC device).

In the indirect models of FIGS. 2(b) and 2(c), an MTC application communicates with a UE (or an MTC device) indirectly through an additional service provided by the 3GPP network. Specifically, the MTC application may use an SCS for additional services provided by a third-party service provider (for which the 3GPP is not responsible) in the example of FIG. 2(b). The SCS may communicate with the 3GPP network through various interfaces. On the other hand, the MTC application may use the SCS for additional services provided by the 3GPP operator (corresponding to a service provider) in the example of FIG. 2(c). Communication between the SCS and the 3GPP network is conducted within a PLMN. In FIGS. 2(b) and 2(c), an interface between the SCS and the MTC application is not dealt with in the 3GPP standards.

Because the indirect models illustrated in FIGS. 2(b) and 2(c) are complementary to each other, not exclusive, the 3GPP operator may combine them for different applications. That is, an MTC communication model may be designed as a hybrid model of both a direct model and an indirect model, as illustrated in FIG. 2(d). In the hybrid model, an MTC device may communicate with a plurality of SCSs in an HPLMN and an SCS controlled by a service provider and an SCS controlled by a 3GPP operator may provide different capabilities to MTC applications.

Figure 3:
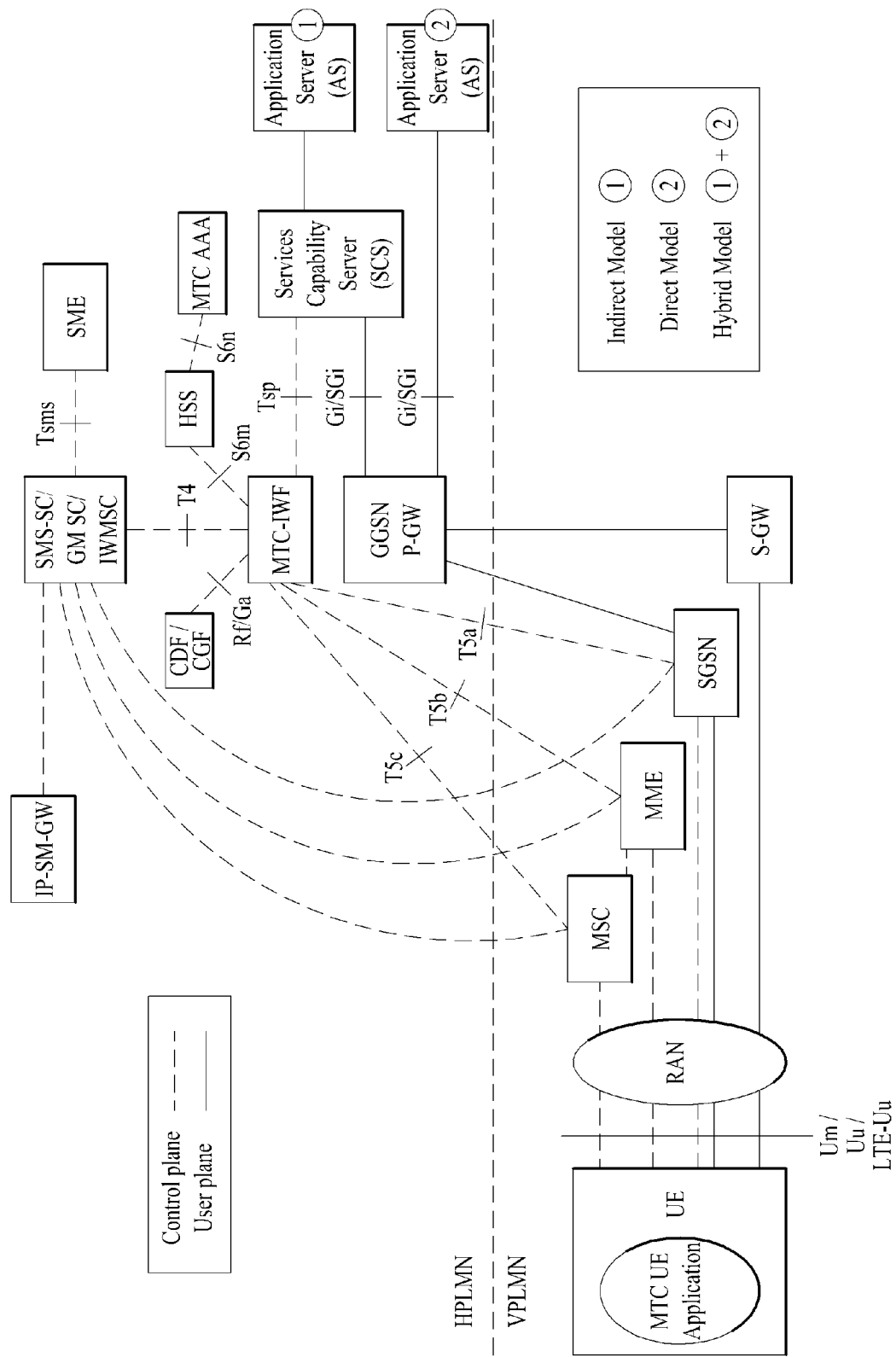
FIG. 3 illustrates an exemplary model of MTC architecture.

FIG. 3 is a view illustrating an exemplary model of MTC architecture.

An end-to-end application between a LTE used for MTC (or an MTC device) and an MTC application may use services provided by a 3GPP system and selective services provided by an SCS. The 3GPP system may provide transport and communication services (including 3GPP bearer service, IMS, and Short Message Service (SMS)) including a variety of optimization services for facilitating MTC. In FIG. 3, a UE used for MTC is connected to a 3GPP network (e.g., UTRAN, E-UTRAN, GERAN or I-WLAN) through a Um/Uu/LTE-Uu interface. The architecture of FIG. 3 includes the various MTC models described with reference to FIG. 2.

A description is now given of entities illustrated in FIG. 3.

In FIG. 3, an MTC application may be executed by an application server of an external network and may use an SCS for an additional service. The above-described various techniques for implementing MTC applications are applicable to an MTC application server and a detailed description thereof is omitted here. In addition, the MTC application server may access an SCS through a reference point Application Programming Interface (API) and a detailed description thereof is omitted here. Or the MTC application server may be collocated with the SCS.

The SCS is a server for managing an MTC device on a network and may be connected to the 3GPP network to communicate with a UE used for MTC and PLMN nodes.

An MTC-IWF may control interworking between an SCS and a core network of an operator and serve as a proxy for an MTC operation. To support an MTC indirect or hybrid model, one or more MTC-IWFs may be present within an HPLMN. The MTC-IWF may relay or interpret a signaling protocol on a reference point Tsp to execute a specific function in a PLMN. The MTC-IWF may perform a function of authenticating an MTC server before the MTC server establishes communication with the 3GPP network, a function of authenticating a control-plane request from the MTC server, various functions related to a trigger indication as described later, etc.

A Short Message Service-Service Center (SMS-SC)/Internet Protocol Short Message GateWay (IP-SM-GW) may manage SMS transmission and reception. The SMS-SC may serve to relay a short message between a Short Message Entity (SME) (i.e., an entity for transmitting or receiving a short message) and a UE and to store and forward the short message. The IP-SM-GW may perform protocol interworking between the UE and the SMS-SC based on IP.

A Charging Data Function (CDF)/Charging Gateway Function (CGF) may perform operations related to charging.

An HLR/HSS may store and provide subscriber information (e.g., an IMSI), routing information, configuration information, etc. to the MTC-IWF.

An SGSN/MME may perform control functions such as mobility management, authentication, and resource allocation for a network connection of a UE. The SGSN/MME may receive a trigger indication from the MTC-IWF in relation to later-described triggering and process the trigger indication into a message transmittable to an MTC device.

A Gateway GPRS Support Node (GGSN)/Serving-Gateway (S-GW)+Packet Data Network-Gateway (P-GW) may serve as a gateway for connecting a core network to an external network.

[Table 2] lists major reference points illustrated in FIG. 3.

TABLE 2

| Reference Point | Description |
|---|---|
| Tsms | Reference point that an entity outside the 3GPP system uses to communicate with MTC device via SMS. |

TABLE 2-continued

| Reference Point | Description |
|---|---|
| Tsp | Reference point that an entity outside the 3GPP system uses to communicate with MTC-IWF in relation to control-plane signaling. |
| T4 | Reference point used by MTC-IWF to route device trigger to SMS-SC in HPLMN. |
| T5a | Reference point between MTC-IWF and SGSN. |
| T5b | Reference point between MTC-IWF and serving MME. |
| T5c | Reference point between MTC-IWF and serving MSC. |
| S6m | Reference point used by MTC-IWF to interrogate HSS/HLR for E.164 MSISDN or external identifier mapping to IMSI and gather UE reachability and configuration information. |
| S6n | Reference point supporting communication that subscriber information and MTC device (UE) information between MTC-AAA and HSS/HLR include. |

User-plane communication with an SCS in the case of indirect and hybrid models and communication with an MTC application server in the case of direct and hybrid models may be performed using a legacy protocol through reference points Gi and SGi. Further, the 3GPP standards define various schemes for implementing MTC, such as adjusting a paging range for an MTC application having low mobility. However, communication between MTC devices (e.g., D2D communication) is not incorporated in the 3GPP standards. Although the description of the present invention is given mainly in the context of an MTC operation between an SCS and an MTC device for that reason, this does not limit the scope of present invention. In other words, it is apparent that the principle of the present invention is also applicable to MTC between MTC devices. In addition, although the 3GPP GSM/UMTS/EPS defines communication through a PS network in relation to MTC as described before, this is merely exemplary. That is, the present invention is applicable to MTC through a CS network, not limited to MTC through a PS network.

The detailed descriptions given above in relation to FIGS. 2 and 3 can be incorporated by reference in this specification by referring to 3GPP TS 23.682.

MTC-Supporting Techniques

MTC may be characterized by transmission and reception of a small amount of information relative to legacy user-to-user communication, low frequency of data transmission and reception, unreliable power supply to an MTC UE, insensitiveness to transmission and reception delay, etc. To support these MTC features, a scheme for minimizing the power consumption of an MTC UE, a scheme for detecting a connection state of an MTC UE, etc. are under discussion.

Appropriate modification of an existing Discontinuous Reception (DRX) scheme may be considered to reduce the power consumption of a UE. The existing DRX scheme defines power-off of a transmission and reception end (e.g., modem) of a UE in the absence of data to be transmitted to or from the UE.

Figure 4:
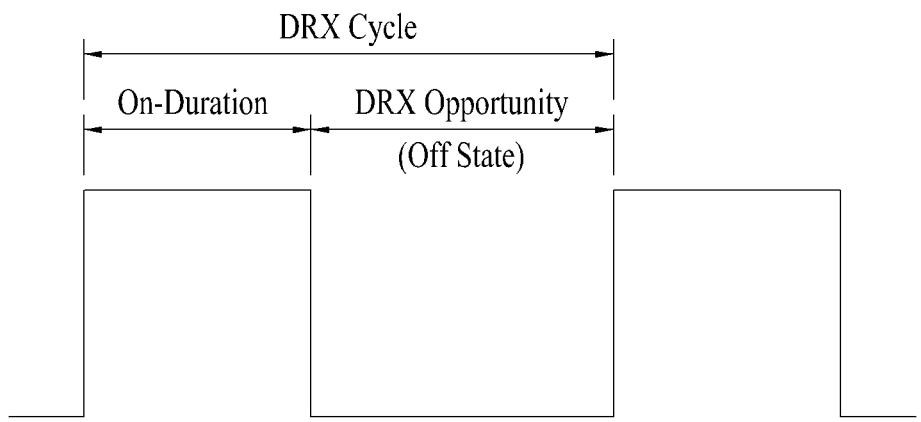
FIG. 4 is a view referred to for describing a conventional Discontinuous Reception (DRX) scheme.

FIG. 4 is a view referred to for describing the existing DRX scheme.

DRX is related to an operation for transmitting information about radio resource allocation or a paging message to a UE by a BS (e.g., an (e)Node B or H(e)Node B) during communication between the BS and the UE. If the UE always monitor radio resource allocation information or a paging message, the UE consumes much power. To avert this problem, the BS transmits radio resource allocation information or a paging message to the UE only at a specific time according to a rule preset between the UE and the BS and the UE monitors the radio resource allocation information or the paging message only at the specific time. Thus, the power consumption of the UE can be reduced.

FIG. 4 illustrates a DRX cycle. In FIG. 4, the horizontal axis represents time and the vertical axis represents an on/off state of a reception module in a UE. Referring to FIG. 4, the UE monitors radio resource allocation information or a paging message transmitted by an eNB during an on-duration period. A DRX opportunity represents an inactive state or an off state. The UE does not monitor radio resource allocation information or a paging message transmitted by the eNB and sets its reception module (e.g. modem) to the off state during the DRX opportunity. The DRX cycle includes the on-duration and the DRX opportunity. An existing DRX cycle is a few seconds long.

In addition, an RRC state of the UE should be considered. The RRC states of the UE may include Connected state or Idle state. The Connected state refers to a state in which an eNB maintains allocated resources and a context for a UE. Context information about the UE includes UE state information, security information, and a bearer ID connected to an S1-connection. In the Connected state, the UE may transmit and receive data via a radio link. On the other hand, the Idle state refers to a state in which the eNB deallocates the resources from the UE and releases the context information about the UE.

This RRC state (i.e., the Connected or Idle state) should be distinguished from a DRX operation in which the UE monitors resource allocation information or a paging message transmitted by the eNB. That is, the on-duration and the off-duration are defined from the perspective of the on and off of the reception module of the UE in the DRX operation and the RRC states are defined irrespective of the on and off of the reception module of the UE. For example, the UE may be maintained in the Connected state in the eNB in both on and off states of the reception module of the UE.

Meanwhile, these RRC states should be distinguished from an attached or detached state of the UE to or from the network (i.e., the core network). The UE is attached to the network in a power-on state and the attached state may correspond to a state in which the context of the UE is maintained in the network. The detached state may correspond to a state in which the context of the UE is released in the network. That is, the RRC state (i.e., Connected/Idle) may be defined depending on whether the eNB maintains the resource allocation/context for the UE from the perspective of the radio link between the eNB and the UE, and the attached/detached state may be defined depending on whether the core network maintains the context information about the UE from the perspective of the core network. For example, if the UE is attached to the network and then transmits no data, the RRC state of the UE is the Idle state. Then if the UE is placed in the Connected state after signaling with the eNB, the UE may transmit or receive data.

To reduce the power consumption of a UE as described before, a method for lengthening a DRX cycle (e.g., the DRX cycle is set to a few hours or longer) has been proposed. Since this method lengthens a time period during which the reception module of the UE is kept in the off state, the power consumption of the UE can be reduced.

On the other hand, in the absence of transmission data in the UE, the UE may be kept in the Idle state. Then upon generation of transmission data, the UE may transition to the Connected state. To transition to the Idle state or the Connected state, the UE should exchange signaling with the eNB, thereby consuming additional power. Accordingly, a method for reducing the power consumption of the UE by lengthening a DRX cycle while maintaining the UE in the Connected state (e.g., in the state where the eNB maintains the resource allocation information and context information about the UE) has been proposed to reduce the power consumption of the UE for RRC state switching.

As another method for reducing the power consumption of a UE, a detach/reattach operation has been proposed. Conventionally, once the UE is attached to the 3GPP system (e.g., the core network), the UE is kept in the attached state unless otherwise needed. That is, if the UE succeeds in attachment, the UE may be kept in the Idle state in the absence of transmission data and then transition to the Connected state in which the UE may transmit or receive data. To reduce the power consumption of the UE in the conventional method, a method for detaching the UE from the 3GPP system in the absence of data to be transmitted from or to the UE and attaching the UE to the 3GPP system upon generation of transmission data or at a specific time has been proposed. For example, if the network requests detachment of the UE or at a specific time based on a detach timer, the UE may perform detachment. The UE may activate a reattach timer after the detachment and upon expiration of the reattach timer, may attempt reattachment. Or the UE may attempt reattachment periodically after the detachment. However, since the UE should perform additional signaling with the network for detachment/reattachment that is not performed in the conventional operation, the UE further consumes power.

Meanwhile, in view of the nature of an MTC UE that once the MTC UE is installed, it operates without human intervention, it is necessary to detect an offline state of the MTC UE, for management of a risk such as malfunction, loss, or wrong use of the MTC UE. To avert the MTC problem and conduct MTC properly, an offline indication scheme has been proposed. According to the offline indication scheme, a network or an eNB monitors a connection state of a UE once or more times based on subscriber information about the UE during a predetermined detection time. If the UE updates its location periodically in the Connected or Idle state, related signaling occurs. Accordingly, the network may determine whether the UE is online or offline and thus the offline detection may be performed for the network to determine whether the UE is offline when the UE does not perform signaling with the eNB or the network (e.g., in the Idle state without location update). For this purpose, the UE may use a specific timer and upon expiration of the specific timer, the UE may indicate its connection state to the network and the network may monitor the online/offline state of the UE accordingly.

For example, a UE's reporting scheme by NAS-based network polling (e.g., a core network indicates a detection time to a RAN by a RANAP message, the RAN checks a connection state of the UE by transmitting a specific message to the UE or paging the UE at every detection time, and the UE transmits information (e.g., an indicator set by the core network) indicating its online state to the core network by a NAS message, or a UE's autonomous indication scheme (e.g., a core network indicates a detection time to a RAN by a RANAP message, the RAN indicates the detection time to the UE by an RRC message, and the UE transmits information indicating its online state to the core network by a NAS message) may be used. If the network fails to receive information to be received from the UE (i.e., an indication indicating that the UE is online) at every predetermined period or by polling of the network, the network may determine that the UE is offline.

Also, a UE's reporting scheme by RAN-based network polling (e.g., a core network indicates a detection time to a RAN by a RANAP message, the RAN checks a connection state of the UE by transmitting a specific message to the UE or paging the UE at every detection time, and the UE transmits information indicating its online state to the RAN by an RRC message at every detection time, or a UE's autonomous indication scheme (e.g., a core network indicates a detection time to a RAN by a RANAP message, the RAN indicates the detection time to the UE by an RRC message, and the UE transmits information indicating its online state to the RAN by an RRC message at every detection time) may be used. If an eNB fails to receive information to be received from the UE (i.e., an indication indicating that the UE is online) at every predetermined period or by polling of the eNB, the eNB may determine that the UE is offline.

If the UE transitions to the Idle state, the eNB releases a context from the UE in the RAN-based scheme. Therefore, the afore-described offline indication scheme is not viable. To solve this problem, the offline indication operation of the UE may be performed, while the UE is kept in the Connected state (e.g., in the state where the eNB maintains resource allocation information, context information, etc. about the UE).

Improved Methods for Managing eNB Resources

Maintaining a UE in the Connected state along with lengthening of a DRX cycle as described before may be an optimum method for reducing the power consumption of the UE. Even in the offline indication scheme designed to solve an MTC problem, the RAN-based offline indication scheme may be performed appropriately only when the LIE is maintained in the Connected state. Therefore, it is necessary to maintain the UE in the Connected state in the foregoing MTC-supporting schemes.

The present invention provides a method for solving a problem encountered with management of eNB resources due to maintenance of a UE in the Connected state.

Conventionally, upon generation of transmission data in a UE, the UE transitions to the Connected state. Then an eNB may receive a UE context from a network (i.e., a core network) and provide control information for data transmission of the UE using context information corresponding to the UE context. In the absence of further transmission data after the data is transmitted in the Connected state, the UE transitions to the Idle state and the eNB releases the UE context information. According to the foregoing MTC-supporting schemes, the UE should be kept in the Connected state. This means that the eNB maintains the context of the UE irrespective of whether the UE transmits data or not.

If the UE is kept in the Connected state despite the absence of transmission data, the eNB maintains the context information about the UE. Considering that far more MTC UEs than legacy UEs are deployed and used, the eNB may experience lack of available resources (e.g., an internal memory, radio resources, etc.) or waste the available resources, for storing and maintaining the contexts of a large number of MTC UEs. In other words, if the eNB stores and maintains context information about UEs for which no data transmission and reception occurs, the eNB may not operate properly due to an increased load of the eNB, or to support the storage and maintenance of the context information, the cost of preparing large resources for the eNB may increase.

The present invention provides a method for maintaining a UE in the Connected state, while reducing load or cost of an eNB.

If DRX is configured for a UE, an eNB transmits information about a DRX configuration (e.g., an on-duration timer value, a DRX cycle, etc.) to the UE. Further, the eNB receives information about the DRX configuration from a network. For example, UE context information of subscriber information about the UE stored in the network may include the DRX configuration information. If DRX is configured for the UE, the DRX configuration information is known to the eNB in this manner. Therefore, the eNB may be aware of a time period during which the UE maintains on-duration, a time period during which the UE is inactive, etc.

If long DRX (i.e., DRX having a longer DRX cycle than an existing DRX cycle) is configured for the UE, the eNB may perform the foregoing MTC-supporting schemes as far as it maintains a UE context of the UE while the UE is in an off state.

To reduce the load of resource management of the eNB, the eNB may predict a time point when an on-duration timer expires or a DRX opportunity (an inactive or off state) starts and thus store or back up the UE context of the UE (or the eNB may request a control server to store UE context information by transmitting the UE context information to the control server). The control server may be a control-plane control node such as an MME, SGSN, or MSC of the core network or a user-plane control node such as an S-GW. Although the eNB does not store the UE context information directly, the eNB may store or back up the UE context information by means of the external server and when needed, retrieve the UE context information. Therefore, it may be said that a virtual Connected state is maintained.

Further, the eNB may store all or part of the UE context information in a control server of a network. For example, the eNB may transmit only the difference (or a changed part) between UE context information that the eNB requests the control server to store and UE context information that the control server has already stored or acquired from another network node (e.g., an HSS/HLR), without a common part (or an unchanged part) between the UE context information, so that the control server may store the difference. As a consequence, the increase of signaling overhead between the eNB and the control server can be minimized.

Further, since the control plane is separated from the user plane in the 3GPP LTE-series systems, the eNB may transmit the UE context information to the control plane and the user plane. For example, the eNB may transmit part of the UE context information to a control-plane control node, MME and the other part of the UE context information to a user-plane control node, S-GW. Or the eNB may transmit the same UE context information (the whole or part of the UE context information) to the control-plane control node MME and the user-plane control node S-GW.

To transmit the UE context information to the control server of the network as described before, the eNB may preliminarily transmit to the control server information (e.g., capability information or indication information) indicating that it can transmit UE context information. The eNB may transmit the UE context information transmission capability information/indication information to the control server in a mobility procedure (e.g., an attach procedure, a Tracking Area Update (TAU) procedure, a Routing Area Update (RAU) procedure, a Location Area Update (LAU) procedure, etc.).

Figure 5:
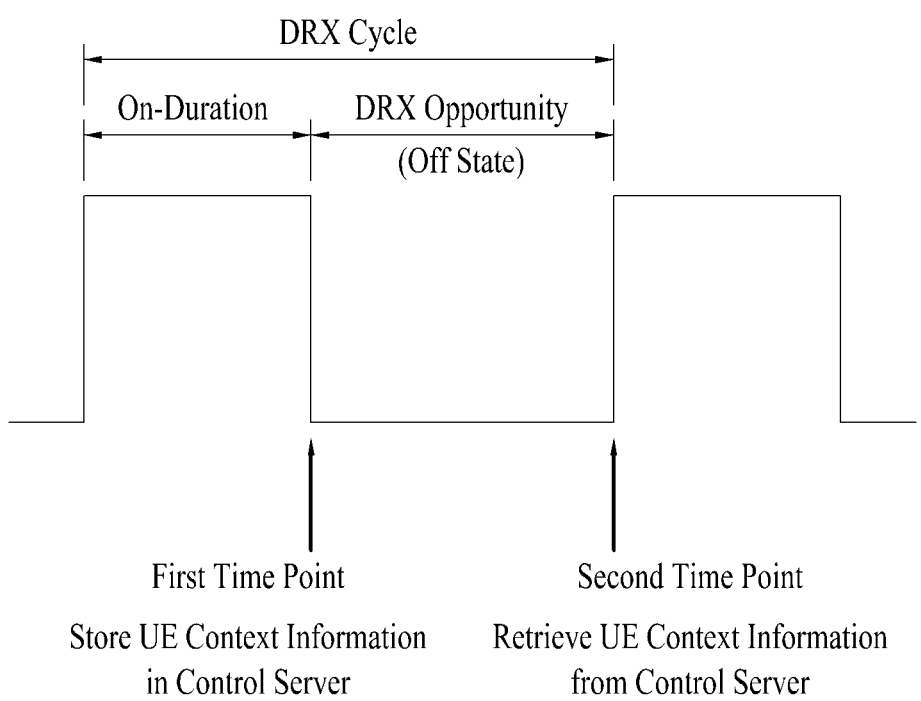
FIG. 5 is a view referred to for conceptually describing an operation of an evolved Node B (eNB) according to the present invention.

FIG. 5 is a view referred to for conceptually describing an operation of an eNB according to the present invention.

In FIG. 5, an operation based on a DRX cycle (an on-duration and a DRX opportunity) of a UE is performed in the manner described with reference to FIG. 4. The UE may monitor control information or a paging message from an eNB during the on-duration. When the on-duration expires and the UE enters the DRX opportunity (i.e., off state), the eNB may store a UE context of the UE in a control server of a network (or request the control server to store the UE context of the UE).

The eNB may transmit a send-back timer value to the control server along with all or part of information about the UE context to the control server. Upon expiration of the send-back timer, the control server may transmit to the eNB the UE context that has been stored upon request of the eNB. The eNB may determine the send-back timer value in consideration of DRX configuration information (e.g., a DRX cycle, an on-duration period, a DRX opportunity length, etc.) for the UE in order to retrieve the UE context information from the control server before the UE returns to the on-duration state.

The send-back timer value may be set to an absolute or relative value. For example, an absolute time point specified by a time reference shared between the eNB and the control server may be set as a time point when the send-back timer is supposed to expire. Or the send-back timer may be set to expire a predetermined time after a time when the send-back timer value is received from the eNB.

Accordingly, the eNB may transmit the UE context information (specifically, all or part of the UE context information) and/or related information (e.g., UE context information transmission capability information/indication information and/or send-back timer information) to the control server, taking account of information about the DRX cycle of the UE, so that the UE context information may be stored in the control server of the network at a first time point (e.g., an expiration time of the on-duration timer or a starting time of the DRX opportunity (or off state) of the UE). Also, the eNB may retrieve the UE context information stored in the control server at a second time (e.g., at an ending time of the DRX opportunity (or off state) of the UE or at a starting time of the on-duration timer of the UE).

Accordingly, the eNB does not need to allocate internal resources for storing the UE context information about the UE and may retrieve the UE context information at a time when the UE wakes up from the off state. As a result, the efficiency of resource utilization of the eNB can be increased and the load of the eNB can be reduced. Further, although additional signaling overhead for transmitting and receiving the UE context information and/or the related information to and from the control server may occur to the eNB according to the present invention, the increase of the signaling overhead between the eNB and the network is readily accepted relative to the increase of signaling load on a radio link between the eNB and the UE or the increase of an internal storage space of the eNB. Further, if the UE context information is not changed much, the amount of actually transmitted and received information is not large, thereby not causing a large signaling overhead increase. Therefore, if the method of the present invention is implemented, the eNB may operate in the same manner as if the UE were kept in the Connected state, while mitigating the constraint of maintaining the UE context information. Accordingly, the present invention is favorable compared to conventional storage/maintenance of UE context information in an eNB.

In addition, the eNB may implement the proposal of the present invention by separating a legacy UE from an MTC UE. For example, the eNB may not apply the proposal of the present invention to a legacy UE, while performing an operation for storing UE context information in a control server at a time when an MTC UE transitions to an off state and when needed, retrieving the UE context information from the control server, for MTC UE. Because a DRX opportunity (i.e. the off state) lasts longer for the MTC UE than the legacy UE and more MTC UEs than legacy UEs exist, the load of storing/maintaining UE context information for the MTC UEs is large for the eNB. To distinguish legacy UEs from MTC UEs, the network or the eNB may allocate bearer IDs of a specific range or special channels to the MTC UEs. In other words, the bearer IDs of the specific range or the special channels may be allocated only to the MTC UEs and the operation for storing UE contexts in a control server and retrieving the UE contexts from the control server according to the present invention may be implemented only for the MTC UEs.

While a UE is in an off state, DL data may occur for the UE. Then an S-GW or an SGSN may check UE context information transmission capability information/indication information about the eNB. If the UE context information transmission capability information/indication information indicates that the eNB can store UE context information in the control server, the S-GW or SGSN may determine that the UE context information is not stored in the eNB while the UE is in the off state. Thus, the S-GW or SGSN may buffer the DL data for the UE or indicate to a data originator that the data transmission will be delayed. Or if DL data is generated for a UE while the UE is in an off state and the UE context information transmission capability information/indication information about the eNB indicates that the eNB can store UE context information in the control server, the S-GW or SGSN may determine that the UE context information is not stored in the eNB while the UE is in the off state and transmit UL context information about the UE along with the DL data for the UE to the eNB, so that the eNB may buffer the DL data and, when the UE transitions to an on-Duration, transmit the DL data to the UE.

Figure 6:
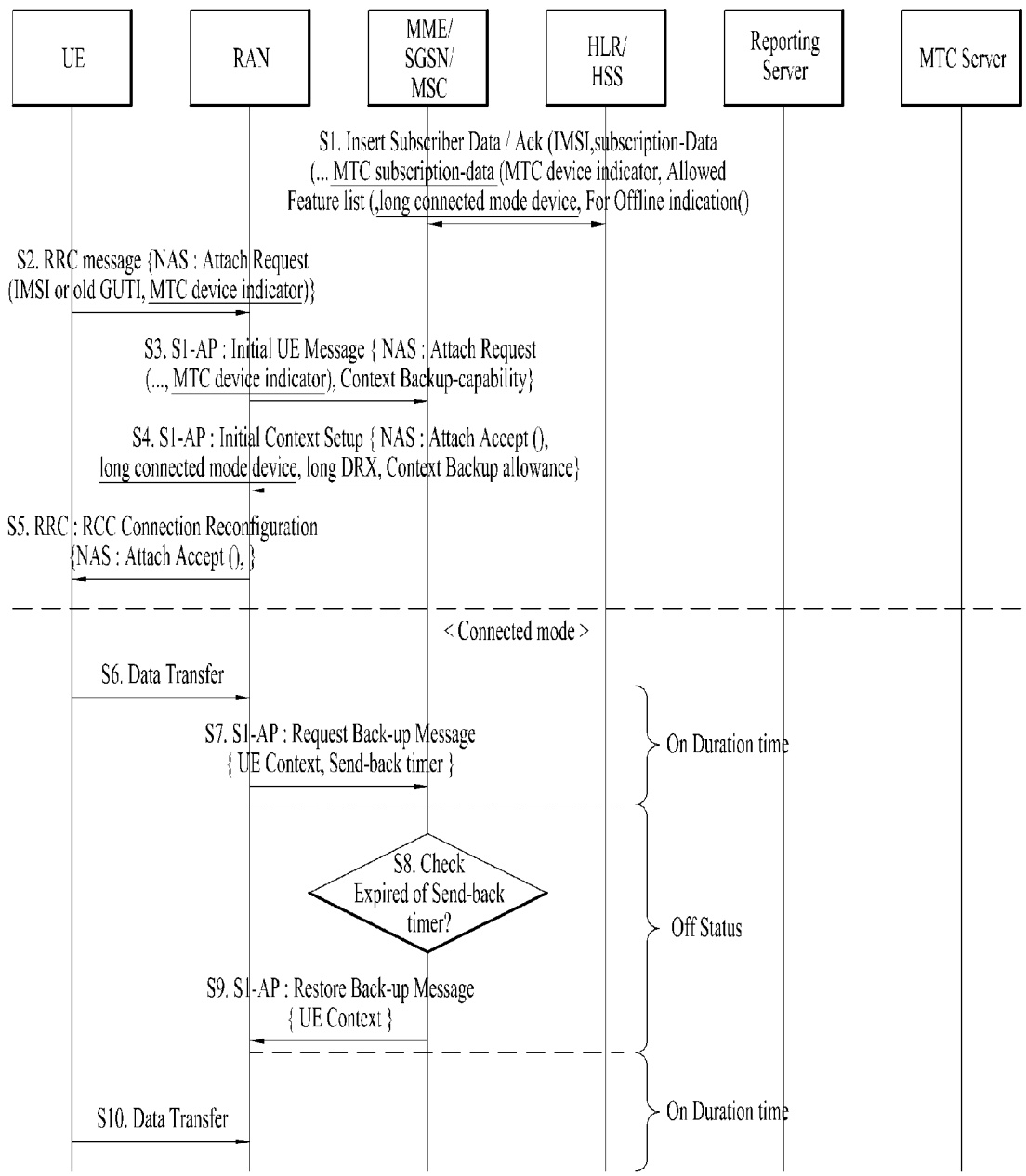
FIG. 6 is a diagram illustrating a signal flow for a method for managing resources of an eNB, when long DRX is used.

FIG. 6 is a view referred to for describing a method for managing resources of an eNB, when long DRX is used.

In FIG. 6, S1 to S5 are about an operation for providing capability information to a control server and acquiring a permission from the control server by an eNB.

Referring to FIG. 6, an HLR/HSS transmits subscriber information to an MME/SGSN/MSC in S1. The HLR/HSS may provide the subscriber information upon request of the MME/SGSN/MSC. The subscriber information may include an ID (e.g., an IMSI) of a UE, subscription information, etc. If the UE is an MTC UE, the subscription information may include MTC subscription data. The MTC subscription data may include an MTC device indicator, an allowed feature list (e.g., a long Connected mode device and an offline indication), etc. If the subscription information indicates that the UE supports a long Connected mode, the eNB needs to maintain a UE context of the UE even in the off state of the UE.

In S2 and S3, for attachment, the UE may transmit its ID (e.g., IMSI or Globally Unique Temporary UE Identify (GUTI)) and information indicating that it is an MTC device to the core network through a RAN. That is, the eNB and the core network may determine from the ID of the UE or MTC device indicator included in an attach request that the request has been transmitted by an MTC device. To indicate that the UE is an MTC device by the ID of the UE, values within a predetermined range from among values available as IDs may be preset for MTC device indication. The RAN (i.e., the eNB) may receive the attach request from the UE by an RRC message and transmit the attach request to a control node (i.e., the MME/SGSN/MSC) of the core network via S1-AP. This message that the UE transmits to the control node of the core network via the RAN may be configured in the form of a NAS message. Also, an Initial UE message that the RAN transmits to the MME/SGSN/MSC may include information about the UE context backup capability of the eNB. Further, the UE context backup capability information about the eNB may be transmitted to the S-GW directly or via the MME.

In S4, the control node (i.e., the MME/SGSN/MSC) of the core network may set a long DRX value by confirming that the UE is an MTC device and supports the long Connected mode and may also determine whether to allow UE context backup of the eNB by checking the UE context backup capability information about the eNB. Accordingly, the MME/SGSN/MSC may transmit a NAS attach accept message as an initial UE context setup message and the NAS attach accept message may include long DRX configuration information, context backup allow information, etc.

In S5, the RAN may transmit an attach accept message as an RRC connection reconfiguration message to the UE. Thus, the UE may be set to the Connected state.

In S6, the UE may transmit data and the UE and the eNB may start a DRX operation after the data transmission. Even though the UE enters an off state by starting the DRX operation, the UE is kept in the Connected state according to configuration of the long DRX mode.

In S7, the RAN transmits a backup request message to the control server (MME/SGSN/MSC) to request the control server to store a UE context of the UE upon expiration of an on-duration. The backup request message may include all or part of the UE context information. The backup request message may further include a send-back timer value. After the eNB transmits UE context information and related information to the control server, that is, when a DRX opportunity of the UE starts, the UE may turn off a radio end (e.g., a modem).

In S8, the control server (e.g., the MME/SGSN/MSC) determines whether a send-back timer has expired. If the send-back timer is still running, the control server maintains a backup of the UE context. On the other hand, upon expiration of the send-back timer, the control server transmits the UE context to the eNB in S9.

In S10, the UE stays in the connected mode. Upon generation of transmission data, the UE may check the on-duration and transmit the data. After S10, S7, S8, and S9 may be repeated.

Figure 7:
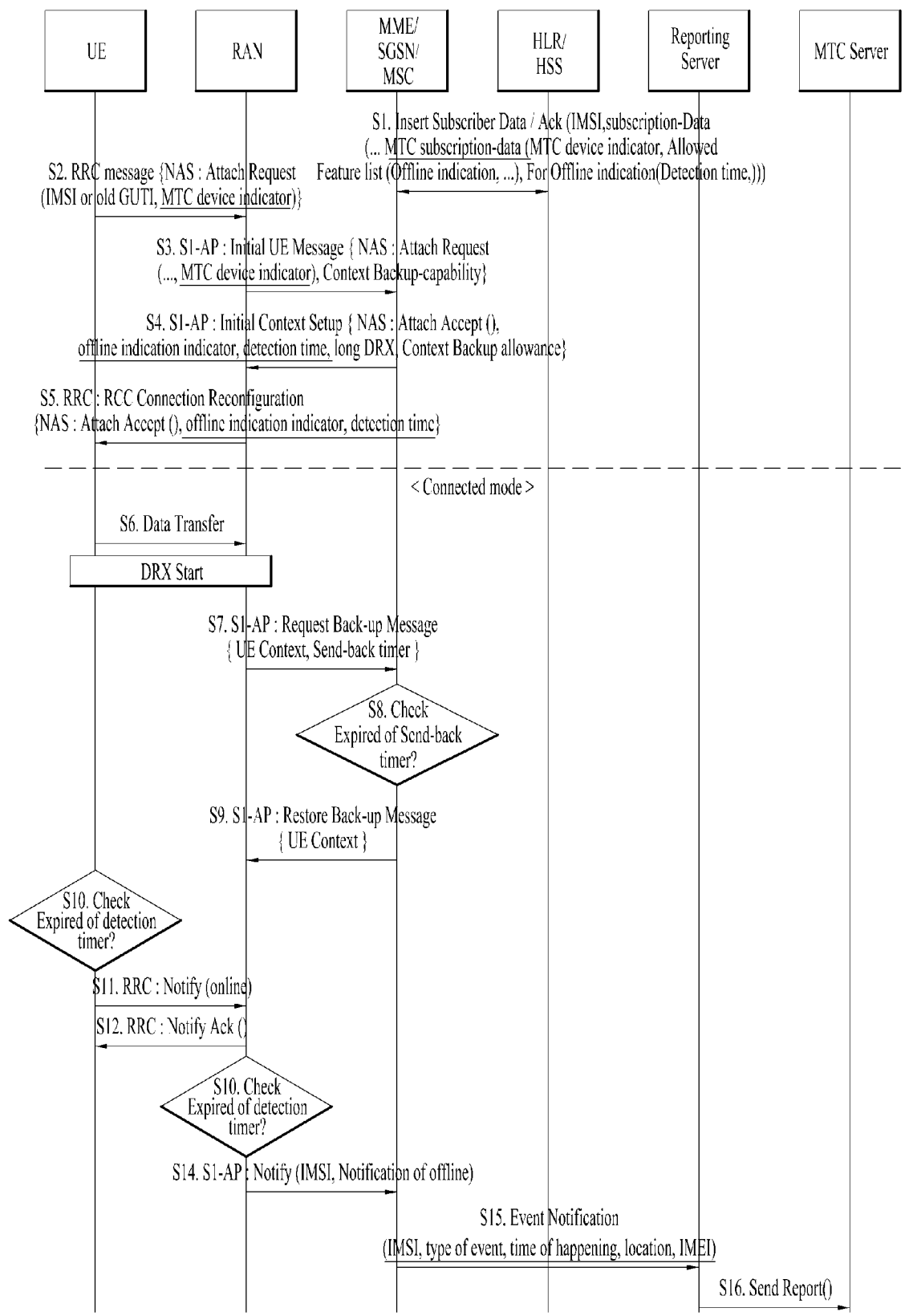
FIG. 7 is a diagram illustrating a signal flow for a method for managing resources of an eNB, when an offline indication is used.

FIG. 7 is a diagram illustrating a signal flow for a method for managing resources of an eNB, when an offline indication is used.

S1, S2, and S3 of FIG. 7 are identical to S1, S2, and S3 of FIG. 6 and thus will not be described herein.

Referring to FIG. 7, an attach accept message that the control server (an MME/SGSN/MSC) of the core network transmits to the eNB (RAN) may include an offline indication and detection time information in S4.

In S5, the eNB may transmit the attach accept message to the UE by an RRC message by including the detection time and the offline indication. Therefore, the UE may transmit information indicating that it is in an online state to the eNB/network, periodically or by polling of the eNB/network.

S6 to S9 of FIG. 7 are identical to S6 to S9 of FIG. 6 and thus will not be described herein.

In S10, the UE determines whether a detection time timer has expired.

Upon expiration of the detection time timer, the UE transmits a notification message indicating that it is in the online state to the eNB (RAN) by an RRC message in S11.

In S12, the eNB may transmit an ACKnowledgment (ACK) message to the UE in response to the notification message received in S11.

In S13, the eNB (RAN) determines whether the detection time timer has expired.

If the eNB fails to receive the notification message indicating the online state from the UE until the expiration of the detection time timer or the UE does not respond to polling of the eNB, the eNB may transmit a message indicating that the UE is in an offline state to the controller server (MME/SGSN/MSC) of the core network by an S1-AP message in S14.

If the control server (MME/SGSN/MSC) has not received a message indicating that the UE is in the online state, the control server transmits to a reporting server a report message including the subscriber ID (e.g., IMSI) of the UE, an offline indication, an occurrence time, a location, a device ID (International Mobile Station Equipment Identity (IMEI)), etc. The report message may be configured to be similar to a NAS message or in the form of an SMS message.

In S16 of FIG. 7, the reporting server may transmit a message indicating generation of the event (i.e., non-transmission of a message indicating that the MTC UE is in the online state within a detection time) to an MTC server. Since the MTC server resides outside the 3GPP core network, the message that the reporting server transmits to the MTC server may be configured in various forms including an SMS message, not defined by the 3GPP standards.

Either or both of the long DRC operation and the offline indication operation may be performed in the examples of FIGS. 6 and 7. If the long DRX operation and the offline indication operation are performed simultaneously, a long DRX cycle value for the long DRX operation and a detection time timer value for the offline indication operation may be set separately. Or the long DRX cycle value for the long DRX operation and the detection time timer value for the offline indication operation may be set in a predetermined relationship. For example, the detection time timer value may be set to an integer multiple of the long DRX cycle value and accordingly, the eNB and/or the control server (MME/SGSN/MSC/S-GW) may readjust the detection time timer value and/or the long DRX cycle value.

The foregoing various embodiments of the present invention may be implemented independently or in a combination of two or more.

While it has been described that the foregoing examples of the present invention are applied to a wireless communication service of MTC, the principle of the present invention is also applicable to a location update operation of a UE in a legacy wireless communication system.

Figure 8:
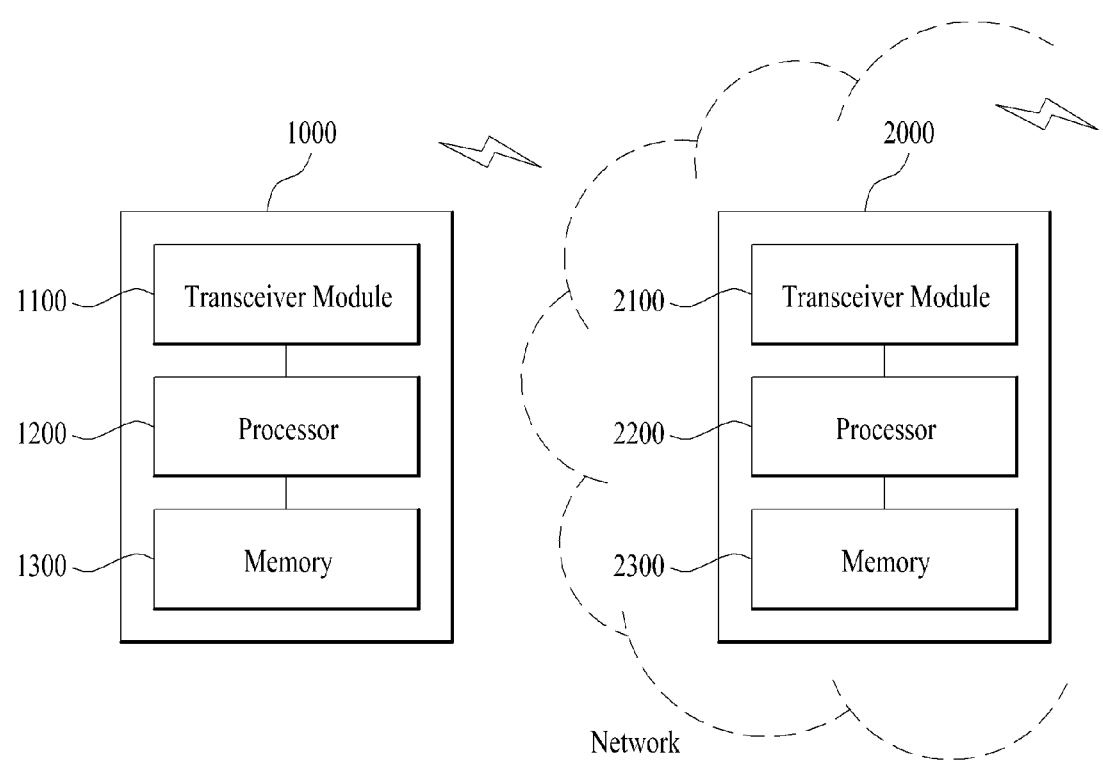
FIG. 8 is a block diagram of a Radio Access Network (RAN) device and a network device according to a preferred embodiment of the present invention.

FIG. 8 is a block diagram of a RAN device and a network device according to a preferred embodiment of the present invention.

Referring to FIG. 8, a RAN device 1000 according to the present invention may include a transceiver module 1100, a processor 1200, and a memory 1300. The transceiver module 1100 may be configured to transmit signals, data, and information to an external device and to receive signals, data, and information from the external device. The RAN device 1000 may be connected to the external device wiredly and/or wirelessly. The processor 1200 may provide overall control to the RAN device 1000 and may be configured to compute and process information to be transmitted to or received from an external device. The processor 1200 may be configured to perform an operation of the RAN (e.g., an eNB) according to the present invention. The memory 1300 may store the computed and processed information for a predetermined time and may be replaced with a component such as a buffer (not shown).

Referring to FIG. 8, a network node device 2000 according to the present invention may include a transceiver module 2100, a processor 2200, and a memory 2300. The transceiver module 2100 may be configured to transmit signals, data, and information to an external device and to receive signals, data, and information from the external device. The network node device 2000 may be connected to the external device wiredly and/or wirelessly. The processor 2200 may provide overall control to the network node device 2000 and may be configured to compute and process information to be transmitted to or received from an external device. The processor 2200 may be configured to perform an operation of the network node (e.g., a control server of a core network, MME, SGSN, MSC, or S-GW) according to the present invention. The memory 2300 may store the computed and processed information for a predetermined time and may be replaced with a component such as a buffer (not shown).

The specific configurations of the above-described UE 1000 and network device 2000 may be implemented so that the foregoing various embodiments of the present invention may be applied independently or two or more of them may be applied simultaneously. To avoid redundancy, the same description is not provided herein.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Further, it is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

The invention claimed is:

1. A method for supporting resource management of a Base Station (BS) by a Mobility Management Entity (MME) in a wireless communication system, the method comprising:
receiving, by the MME, User Equipment (UE) context information from the BS;
storing, by the MME, the received UE context information, at a first time point, wherein the first time point is a time point when an on-duration of the UE ends; and
transmitting, by the MME, the UE context information to the BS at a second time point, wherein the second time point is a time point when an off state period of the UE ends,
wherein the UE is kept in a Radio Resource Control (RRC) connected state during a time period including the first time point and the second time point, when the UE performs long Discontinuous Reception (DRX).

2. The method according to claim 1, further comprising receiving send-back timer information from the BS.

3. The method according to claim 2, wherein the second time point is determined based on the send-back timer information.

4. The method according to claim 1, wherein the UE context information is not stored in the BS during a time period between the first time point and the second time point.

5. The method according to claim 1, wherein an offline indication operation is configured for the UE and a detection time timer for the offline indication operation is set to an integer multiple of the cycle of the long DRX.

6. The method according to claim 1, wherein the UE context information includes changed UE context information from UE context information previously stored in the MME.

7. The method according to claim 1, further comprising:
receiving context backup capability information about the BS; and
transmitting a message allowing context backup of the BS based on the context backup capability information about the BS.

8. The method according to claim 1, wherein the UE context information is context information about a Machine Type Communication (MTC) UE.

9. The method according to claim 1, wherein a predetermined bearer Identifier (ID) or a predetermined channel is allocated to the MTC UE and the method for supporting resource management is applied only to the predetermined bearer ID or the predetermined channel.

10. A method for managing resources by a Base Station (BS) in a wireless communication system, the method comprising:
transmitting, by the BS, User Equipment (UE) context information to a Mobility Management Entity (MME) at a first time point, wherein the first time point is a time point when an on-duration of the UE ends; and retrieving, by the BS, the UE context information from the MME at a second time point, wherein the second time point is a time point when an off state period of the UE ends, wherein the UE context information transmitted to the MME is stored in the MME at the first time point, and the UE is kept in a Radio Resource Control (RRC) connected state during a time period including the first time point and the second time point when the UE performs long Discontinuous Reception (DRX).

11. A Mobility Management Entity (MME) for supporting resource management of a Base Station (BS) in a wireless communication system, the MME comprising:

a transceiver module; and a processor, wherein the processor is configured to receive User Equipment (UE) context information from the BS at a first time point through the transceiver module, store the received the UE context information, and transmit the UE context information to the BS at a second time point through the transceiver module, wherein the UE is kept in a Radio Resource Control (RRC) connected state during a time period including the first time point and the second time point, when the UE performs long Discontinuous Reception (DRX), and wherein the first time point is a time point when an on-duration of the UE ends, and the second time point is a time point when an off state period of the UE ends.

12. A Base Station (BS) for managing resources in a wireless communication system, the BS comprising:

a transceiver module; and a processor, wherein the processor is configured to transmit User Equipment (UE) context information to a Mobility Management Entity (MME) at a first time point through the transceiver module, and retrieve the UE context information from the MME at a second time point, wherein the UE context information transmitted to the MME is stored in the MME at the first time point, and the UE is kept in a Radio Resource Control (RRC) connected state during a time period including the first time point and the second time point, when the UE performs long Discontinuous Reception (DRX), and wherein the first time point is a time point when an on-duration of the UE ends, and the second time point is a time point when an off state period of the UE ends.

* * * * *